(12) United States Patent
Ranish (10) Patent No.: US 11,662,253 B2
(45) Date of Patent: May 30, 2023

(54) METHOD AND APPARATUS FOR MEASURING TEMPERATURE

(71) Applicant: Applied Materials, Inc., Santa Clara, CA (US)

(72) Inventor: Joseph M. Ranish, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 17/515,095

(22) Filed: Oct. 29, 2021

(65) Prior Publication Data

US 2022/0057268 A1 Feb. 24, 2022

Related U.S. Application Data

(62) Division of application No. 16/381,995, filed on Apr. 11, 2019, now Pat. No. 11,162,845.

(Continued)

(51) Int. Cl.
*G01J 5/00* (2022.01)
*G01K 7/01* (2006.01)

(52) U.S. Cl.
CPC .............. *G01J 5/0007* (2013.01); *G01K 7/01* (2013.01)

(58) Field of Classification Search
CPC .................................................. G01J 5/0007

(Continued)

(56) References Cited

U.S. PATENT DOCUMENTS 5,436,443 A 7/1995 Abtahi
5,727,017 A 3/1998 Maurer et al.

(Continued)

FOREIGN PATENT DOCUMENTS

JP H04305130 A 10/1992
JP H06500404 A 1/1994

(Continued)

OTHER PUBLICATIONS

International Search Report/Writtne Opinion dated Aug. 8, 2019 for Application No. PCT/US2019/027099.
Japanese Office Action dated Apr. 19, 2022 for Application No. 2020-571665.

(Continued)

*Primary Examiner* — Mirellys Jagan
(74) *Attorney, Agent, or Firm* — Patterson & Sheridan, LLP (57) ABSTRACT

Apparatuses and methods for measuring substrate temperature are provided. In one or more embodiments, an apparatus for estimating a temperature is provided and includes a plurality of electromagnetic radiation sources positioned to emit electromagnetic radiation toward a reflection plane, and a plurality of electromagnetic radiation detectors. Each electromagnetic radiation detector is positioned to sample the electromagnetic radiation emitted by a corresponding electromagnetic radiation source of the plurality of electromagnetic radiation sources. The apparatus also includes a pyrometer positioned to receive electromagnetic radiation emitted by plurality of electromagnetic radiation sources and reflected from a substrate disposed at a reflection plane and electromagnetic radiation emitted by the substrate. The apparatus includes a processor configured to estimate a temperature of the substrate based on the electromagnetic radiation emitted by the substrate. Methods of estimating temperature are also provided.

18 Claims, 5 Drawing Sheets

Related U.S. Application Data (60) Provisional application No. 62/689,994, filed on Jun. 26, 2018.

(58) Field of Classification Search
USPC .......................................... 374/120, 141, 130
See application file for complete search history.

(56) References Cited

U.S. PATENT DOCUMENTS

| | | | |
|---|---|---|---|
| 6,179,466 | B1 | 1/2001 | Peuse et al. |
| 7,744,274 | B1 | 6/2010 | Grek et al. |
| 8,483,991 | B2 | 7/2013 | Gaertner et al. |
| 8,668,383 | B2 | 3/2014 | Timans |
| 9,909,925 | B2 | 3/2018 | Pan et al. |
| 2001/0010308 | A1* | 8/2001 | Hauf ............... G01J 5/0003 219/390 |
| 2002/0017618 | A1* | 2/2002 | Gat ................... F27B 5/04 250/492.2 |
| 2005/0063448 | A1 | 3/2005 | Kusuda |
| 2006/0027558 | A1 | 2/2006 | Hauf |
| 2014/0248720 | A1* | 9/2014 | Reichel ............. H01L 22/12 374/121 |
| 2015/0357215 | A1 | 12/2015 | Moffatt et al. |
| 2016/0027671 | A1 | 1/2016 | Ranish et al. |
| 2016/0131532 | A1 | 5/2016 | Zernickel et al. |
| 2016/0138188 | A1 | 5/2016 | Ranish et al. |
| 2017/0259294 | A1 | 9/2017 | Ranish et al. |
| 2017/0328775 | A1 | 11/2017 | Aderhold |
| 2017/0330776 | A1 | 11/2017 | Ranish et al. |
| 2018/0023214 | A1 | 1/2018 | Lau et al. |
| 2018/0099353 | A1 | 4/2018 | Jennings et al. |
| 2019/0127851 | A1 | 5/2019 | Lau et al. |

FOREIGN PATENT DOCUMENTS

| | | |
|---|---|---|
| JP | H8285692 A | 11/1996 |
| JP | H11237281 A | 8/1999 |
| JP | 2002357481 A | 12/2002 |
| JP | 2011163825 A | 8/2011 |
| JP | 2014534424 A | 12/2014 |
| JP | 2015513094 A | 4/2015 |
| TW | 489397 A4 | 3/1989 |
| TW | 455677 B | 9/2001 |
| TW | 200717679 A | 5/2007 |

OTHER PUBLICATIONS

Japanese Office Action dated Nov. 1, 2022 for Application No. 2020-571665.
Taiwan Office Action dated Dec. 26, 2022 for Application No. 108112992.

* cited by examiner

METHOD AND APPARATUS FOR MEASURING TEMPERATURE

CROSS-REFERENCE TO RELATED APPLICATIONS

This application is a divisional application of U.S. application Ser. No. 16/381,995 filed on Apr. 11, 2019, which claims priority to U.S. Provisional Application Ser. No. 62/689,994 filed on Jun. 26, 2018, both of which are incorporated by reference in their entirety.

BACKGROUND

Field

Aspects of the present disclosure generally relate to a method and apparatus for measuring a temperature. Further, aspects of the present disclosure relate to non-contact temperature measurement for a processing chamber.

Description of the Related Art

During processing associated with fabrication of semiconductor devices and the like, a number of thermal processing operations are performed on a substrate. Thermal processing generally utilizes temperature measurements for process control. Inaccurate temperature measurements may result in poor process results that may adversely influence semiconductor device performance and/or manufacturing yield.

Optical pyrometry is sometimes used to measure temperature of a substrate in semiconductor device manufacturing processes. Intensity of electromagnetic radiation emitted from the substrate surface is measured by an optical pyrometry sensor and related to temperature using Planck's Law to determine the substrate temperature. In a typical thermal processing chamber, optical pyrometers are exposed to electromagnetic radiation from many sources, such as lamps and hot surfaces inside the chamber, which masks the electromagnetic radiation emitted by the substrate. The interference from electromagnetic noise in the chamber can make it difficult to determine the actual substrate temperature, which may result in erroneous temperature determinations and consequently poor processing results.

Therefore, there is a need for improved apparatuses and methods for substrate temperature measurement.

SUMMARY

Apparatuses and methods for measuring substrate temperature are provided. In one or more embodiments, an apparatus for estimating a temperature includes a plurality of electromagnetic radiation sources positioned to emit electromagnetic radiation toward a reflection plane, and a plurality of electromagnetic radiation detectors, where each electromagnetic radiation detector is positioned to sample the electromagnetic radiation emitted by a corresponding electromagnetic radiation source of the plurality of electromagnetic radiation sources. The apparatus also includes a pyrometer positioned to receive electromagnetic radiation originating from the plurality of electromagnetic radiation sources and reflected from the reflection plane, and a processor configured to estimate a temperature based on the electromagnetic radiation received by the pyrometer and by the electromagnetic radiation detectors.

In other embodiments, a method for estimating a temperature includes emitting, by each of a plurality of electromagnetic radiation sources, electromagnetic radiation toward a substrate, and sampling, by each of a plurality of electromagnetic radiation detectors, the electromagnetic radiation emitted by a corresponding electromagnetic radiation source of the plurality of electromagnetic radiation sources. The method also includes receiving, by a pyrometer, electromagnetic radiation reflected from the substrate and electromagnetic radiation emitted by the substrate; and estimating, using a processor, a temperature of the substrate based on the electromagnetic radiation emitted by the substrate.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

It is contemplated that elements and features of one embodiment may be beneficially incorporated in other embodiments without further recitation. It is to be noted, however, that the drawings illustrate only exemplary embodiments of the disclosure and are therefore not to be considered limiting of its scope, for the disclosure may admit to other effective embodiments.

DETAILED DESCRIPTION

Figure 1:
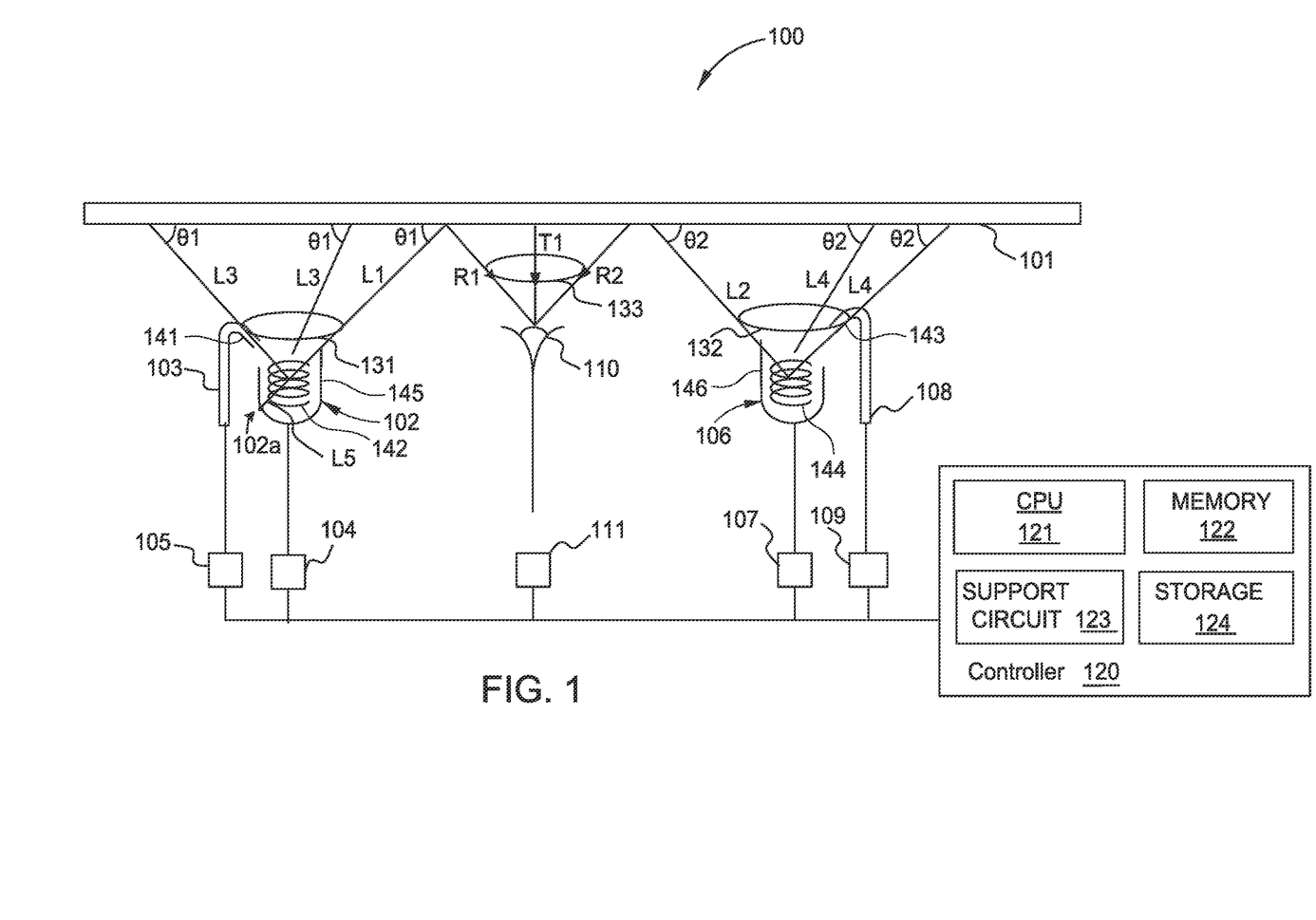
FIG. 1 depicts a simplified schematic diagram of a temperature measurement system in accordance with one aspect of the present disclosure.

In one or more embodiments, an apparatus for estimating a temperature is provided. The apparatus includes a plurality of electromagnetic radiation sources positioned to emit electromagnetic radiation toward a reflection plane, and a plurality of electromagnetic radiation detectors. Each electromagnetic radiation detector is positioned to sample the electromagnetic radiation emitted by a corresponding electromagnetic radiation source of the plurality of electromagnetic radiation sources. The apparatus also includes a pyrometer positioned to receive electromagnetic radiation emitted by plurality of electromagnetic radiation sources and reflected from a substrate disposed at a reflection plane and electromagnetic radiation emitted by the substrate. The apparatus includes a processor configured to estimate a temperature of the substrate based on the electromagnetic radiation emitted by the substrate. Methods of estimating temperature are also provided. FIG. 1 is a simplified schematic diagram of a temperature measurement system 100 in accordance with one aspect of the present disclosure. The temperature measurement system 100 includes electromagnetic radiation sources 102 and 106, electromagnetic radiation detectors 103 and 108, a pyrometer 110, and a controller 120, positioned adjacent a substrate 101.

The substrate 101 may be a wafer or panel substrate capable of having material deposited thereon. In one or more examples, the substrate 101 may be silicon (doped or undoped), crystalline silicon, silicon oxide, doped or undoped polysilicon, or the like, a germanium substrate, a silicon germanium (SiGe) substrate, a Group III-V compound substrate, such as a gallium arsenide substrate, a silicon carbide (SiC) substrate, a patterned or non-patterned semiconductor-on-insulator (SOI) substrate, a carbon-doped oxide, a silicon nitride, a solar array, solar panel, a light emitting diode (LED) substrate, or any other materials such as metals, metal alloys, and other conductive materials. In some examples, the substrate 101 may be a substrate holder or a substrate pedestal, a chucking plate, or the like. Also, the substrate 101 may include a plurality of layers, such as a semi-insulating material and a semi-conducting material, where the semi-insulating material has a higher resistivity than the semi-conducting material. The substrate 101 is not limited to any particular size or shape. The substrate 101 reflects incident electromagnetic radiation having wavelength of about 50 μm to about 100 cm according to the electrical resistivity of substrate material near a surface of the substrate 101.

The temperature measurement system 100 also includes signal generators 104 and 107. The signal generators 104 and 107 apply time-varying power to electromagnetic radiation sources 102 and 106, respectively. In one or more embodiments, each signal generator 104, 107 can generate various waveforms with different periodicities, shapes (e.g., sinusoidal pulses or triangular pulses), patterns, and/or amplitudes. In some cases, the signal generators 104 and 107 can pulse the power to the electromagnetic radiation sources 102 and 106. Use of the signal generators 104 and 107 allows for short bursts of electromagnetic radiation to be emitted from the electromagnetic radiation sources 102 and 106 to determine reflectivity from the substrate 101.

Electromagnetic radiation source 102 emits electromagnetic radiation $L_1$ having time-varying intensity toward the substrate 101 according to a signal provided by the signal generator 104. Electromagnetic radiation source 106 emits electromagnetic radiation $L_2$ having time-varying intensity toward the substrate 101 according to a signal provided by the signal generator 107. In one or more embodiments, each of the electromagnetic radiation sources 102 and 106 can be heat sources (e.g., heating lamps) which provide thermal energy to the substrate 101 for raising the temperature of the substrate 101.

Electromagnetic radiation detector 103 has a probe head 141 disposed adjacent to the electromagnetic radiation source 102, and detects electromagnetic radiation $L_3$ from part of the emission cone 131 of electromagnetic radiation source 102. The electromagnetic radiation $L_3$ corresponds to the electromagnetic radiation $L_1$ that is reflected from the substrate 101 and is detected by the pyrometer 110 as electromagnetic radiation $R_1$. The probe head 141 of the detector 103 is disposed in line-of-sight to the emitting element 142 of the electromagnetic radiation source 102. The electromagnetic radiation in the emission cone 131 has substantially the same intensity at all emission angles within the emission cone 131. In one or more embodiments, a probe head 141 of the detector 103 is aligned with a conical surface of the emission cone 131 of the electromagnetic radiation source 102. In one or more embodiments, the detector 103 is coupled to a sampling circuit 105 to determine sampling rates of the detector 103.

A detector 108 is disposed in line-of-sight to the emitting element 144 of the electromagnetic radiation source 106. The electromagnetic radiation source 106 includes a light emitting element 144 disposed within a reflector 146. The detector 108 includes a probe head 143 disposed adjacent to the source 106, and detects electromagnetic radiation $L_4$ from the emission cone 132 of the source 106 corresponding to the electromagnetic radiation $L_2$. In one or more embodiments, the probe head 143 of the detector 108 is aligned with a conical surface of the emission cone 132 of the electromagnetic radiation source 106. In one or more embodiments, the detector 108 is coupled to a sampling circuit 109 to determine sampling rates of the detector 108. The temperature measurement system 100 may obtain a higher temperature resolution at a higher sampling rate.

In one or more embodiments, the detectors 103 and 108 are made of optical fibers. In other embodiments, the detectors 103 and 108 include probe heads 141, 143 curved at respective angles to be aligned with the radiation beams $L_3$ and $L_4$, respectively. In other embodiments, an opening 102a is formed in a reflector 145 in the electromagnetic radiation source 102. The opening 102a is disposed in a position to pass electromagnetic radiation $L_5$ through the opening 102a to a detector, such as the detector 103, positioned to receive the electromagnetic radiation $L_5$ through the opening 102a. Although not shown, the electromagnetic radiation source 106 may also include an opening similar to opening 102a.

The emitting elements 142, 144 of the respective electromagnetic radiation sources 102 and 106 emit electromagnetic radiation having generally similar intensity in all directions. Thus, electromagnetic radiation $L_3$ has substantially the same intensity as the corresponding electromagnetic radiation $L_1$. Similarly, electromagnetic radiation $L_4$ has substantially the same intensity as electromagnetic radiation $L_2$. In operation, the controller 120 estimates an intensity of the electromagnetic radiation $L_1$ from an intensity of the corresponding electromagnetic radiation $L_3$. Also, the controller 120 can estimate an intensity of the electromagnetic radiation $L_2$ from an intensity of the corresponding electromagnetic radiation $L_4$.

The pyrometer 110 detects electromagnetic radiation emitted and/or reflected from the substrate 101. The electromagnetic radiation received at the pyrometer 110 includes electromagnetic radiation $T_1$ emitted from the substrate 101, and electromagnetic radiation such as $L_1$ and $L_2$ reflected from the substrate 101. In one or more embodiments, the pyrometer 110 includes an optical narrow-band filter having a bandpass of about 20 nm at a wavelength less than 950 nm, that is, at a photon energy above the silicon band gap of about 1.1 eV (about 1.1 μm). The bandpass may be alternately expressed as photon wavelength below the band gap wavelength of the substrate 101. Using pyrometers with narrow-band functionality reduces noise from other sources in other spectral bands, thereby improving measurement accuracy.

In some embodiments, the electromagnetic radiation sources 102 and 106 may be operated at different wavelengths. In this embodiment, the pyrometer 110 would include detecting elements for the different wavelengths to separate the radiation from the individual electromagnetic radiation sources spectrally. In such cases, the temperature measurement system 100 may determine a reflectivity of the substrate 101 while operating the electromagnetic radiation sources concurrently. In such examples, the electromagnetic radiation sources 102 and 106 are configured to emit a spectrum of radiation having a plurality of wavelengths from e.g., infrared to ultraviolet. In one or more embodiments, a Fast Fourier Transform (FFT) analyzer 111 is coupled to the pyrometer 110 to separate reflected radiation received by the pyrometer 110 according to wavelength. In some embodiments, a lock-in amplifier can be coupled to the pyrometer 110 to separate the received reflected radiation. In other embodiments, the electromagnetic radiation sources 102 and 106 are operated one at time, either at the same wavelength or at different wavelengths.

The temperature measurement system 100 is connected to a controller 120 to control aspects of the temperature measurement system 100 during processing. The controller 120 includes a central processing unit (CPU) 121, a memory 122, storage 124, and support circuits 123 for the CPU 121. The controller 120 facilitates control of the components of the temperature measurement system 100, and potentially other components of an apparatus in which the temperature measurement system 100 is used. The controller 120 may be a general-purpose computer that can be used in an industrial setting for controlling various chambers and sub-processors. The memory 122 stores software (source or object code) that may be executed or invoked to control the overall operations of the temperature measurement system 100 in manners described herein. The controller 120 manipulates respective operations of controllable components in the temperature measurement system 100. The controller 120 may include a power supply for the components of the temperature measurement system 100.

The controller 120 is coupled to the plurality of signal generators 104 and 107 and controls signals to be applied to the electromagnetic radiation sources 102 and 106 from respective signal generators 104 and 107. The controller 105 also receives radiation data from the pyrometer 110 and/or circuits corresponding thereto, such as an FFT analyzer (or a lock-in amplifier) 111. The controller 105 processes the radiation data received by the pyrometer 110 to estimate a temperature of the substrate 101 as described below.

In FIG. 1, the electromagnetic radiation sources 102 and 106, the detectors 103 and 108, and the pyrometer 110 are illustrated to be located under the substrate 101. However, these components may be disposed at any convenient location, such as a location above the substrate 101, or to one side of the substrate 101 when the substrate 101 is oriented vertically. Also, any number of sources 102, 106 and detectors 103, 108 can be used. Further, more than one pyrometer 110 can be used to measure temperatures at multiple positions or within different zones of the substrate 101. Multiple sources, detectors, and pyrometers enable improvement in signal-to-noise ratio.

During an operation of monitoring a temperature of the substrate 101, the signal generators 104 and 107 input time-varying signals into the electromagnetic radiation sources 102 and 106. The electromagnetic radiation sources 102 and 106 receive the time-varying signals and emit electromagnetic radiation $L_1$ and $L_2$, respectively, toward the substrate 101 based on the input time-varying signals. The radiation $L_1$ illuminates the substrate 101 at incidence angle $\theta_1$, and is partially absorbed, partially transmitted and/or partially reflected. Likewise, the radiation $L_2$ illuminates the substrate 101 at incidence angle $\theta_2$, and is partially absorbed, partially transmitted and/or partially reflected. Reflected radiation $R_1$ and $R_2$ proceed towards the pyrometer 110.

The detectors 103 and 108 detect radiation $L_3$ and $L_4$, which correspond respectively radiation $L_1$ and $L_2$. The radiation $L_3$ has substantially a same intensity as the corresponding radiation $L_1$, or the intensity of the two radiation components has a defined relationship, so the intensity of the radiation $L_3$ (measured by the detector 103) can be used to determine the intensity of the radiation $L_1$. The radiation $L_4$ and the radiation $L_2$ share a similar relationship, facilitating determination of the radiation $L_2$ using the detector 108

The pyrometer 110 detects total intensity of electromagnetic radiation, which is the total intensity of radiation $T_1$, $R_1$, and $R_2$ combined. The intensity, denoted $I\_S_P$, of the combined electromagnetic radiation detected by the pyrometer 110 is thus the intensity $I\_T_1$ of the radiation $T_1$ plus the intensity $I\_R_1$ of the radiation $R_1$ plus the intensity $I\_R_2$ of the radiation $R_2$. The intensity, $I\_S_P$, of the combined electromagnetic radiation is thus represented as:

$$I\_S_P = I\_T_1 + I\_R_1 + I\_R_2 \quad (1)$$

A reflectivity ρ of the substrate 101 is defined as a ratio of an intensity of a reflection beam (e.g., $R_1$) to an intensity of an incident beam (e.g., $L_1$). Thus, reflectivity ρ of the substrate 101 is represented as:

$$\rho = \frac{\Delta R_2}{\Delta L_2} = \frac{\Delta R_1}{\Delta L_1} \quad (2)$$

Figure 2A:
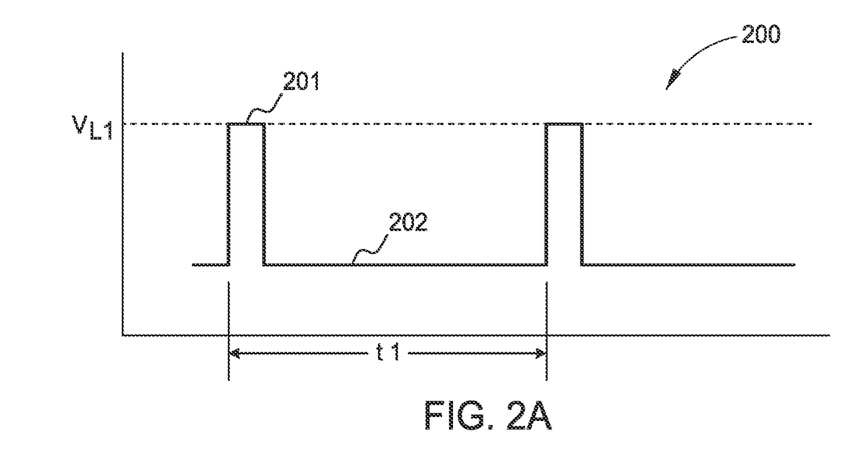
FIGS. 2A, 2B, and 2C illustrate examples of pulse train signals in accordance with one aspect of the present disclosure.

Here, $\Delta L_1$ is the maximum intensity of radiation $L_1$ (e.g., peaks 201 of FIG. 2A) minus the minimum intensity of radiation $L_1$ (e.g., 202 of FIG. 2A). Likewise, $\Delta R_1$ is the maximum intensity of reflected radiation $R_1$ minus the minimum intensity of reflected radiation $R_1$. Similarly, $\Delta L_2$ is the maximum intensity of radiation $L_2$ (e.g., 211 of FIG. 2B) minus the minimum intensity of radiation $L_2$ (e.g., 212 of FIG. 2B). Likewise, $\Delta R_2$ is the maximum intensity of reflected radiation $R_2$ minus the minimum intensity of reflected radiation $R_2$.

In one or more embodiments, in order to determine the reflectivity ρ, the temperature measurement system 100 can activate only one of the electromagnetic radiation sources 102, 106 to emit electromagnetic radiation and measure reflected radiation. The reflectivity ρ is dependent on the temperature of the substrate 101, facilitating determination of the temperature of the substrate 101.

The intensity ($I\_T_1$) of the emitted radiation $T_1$ is represented by the following equation:

$$I\_T_1 = I\_S_P - I\_R_1 - I\_R_2 = I\_S_P - \rho \times I\_L_1 - \rho \times I\_L_2 \quad (3)$$

As noted above, the electromagnetic radiation $L_1$ and $L_2$ each have substantially same intensities ($I\_L_1$, $I\_L_2$) of respective corresponding electromagnetic radiation $L_3$ and $L_4$ (e.g., $I\_L_3$, $I\_L_4$) (which is sampled and measured by the electromagnetic radiation detectors 103, 108, respectively). Thus, due to this equality, Equation 3 can be rewritten as:

$$I\_T_1 = I\_S_P - I\_R_1 - I\_R_2 = I\_S_P - \rho \times I\_L_3 - \rho \times I\_L_4 \quad (4)$$

The absolute temperature T of the sample is calculated by applying Planck's Law, which holds that the emitted radiation $T_1 = B_v(v,T)$, where spectral radiance of frequency v from a body at absolute temperature T is given by:

$$B_v(v,T) = \frac{2hv^3}{c^2} \frac{1}{e^{\frac{hv}{k_B T}} - 1} \quad (5)$$

Here, $k_B$ is Boltzmann's constant, h is Planck's constant, and c is the speed of light in the medium, whether material or vacuum, and T is an absolute temperature of the substrate 101. Adherence to Planck's Law is generally mediated by an object's emissivity, which is defined as the ratio of actual thermal radiation output to theoretical output according to Planck's Law. Thus, Planck's Law can be used to estimate temperature of an object, such as the substrate 101.

The above series of equations describe how to estimate a temperature of the substrate 101 based on two radiation samples. However, these equations can be extended to any embodiment where a pyrometer receives an arbitrary number of radiation samples as discussed further below.

Figure 2B:
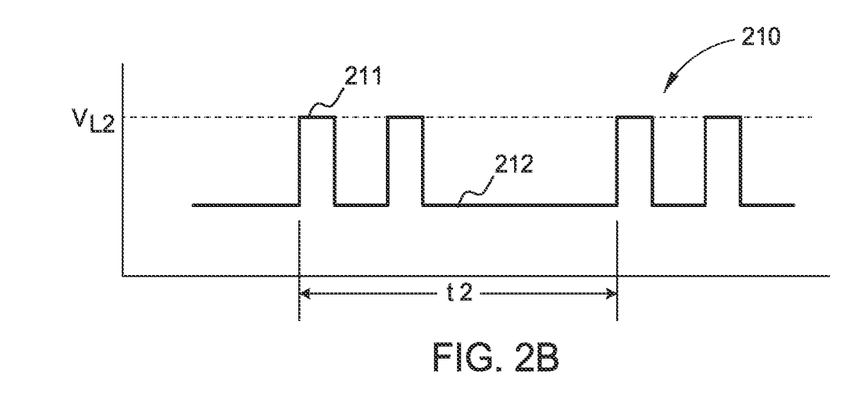
Figure 2C:
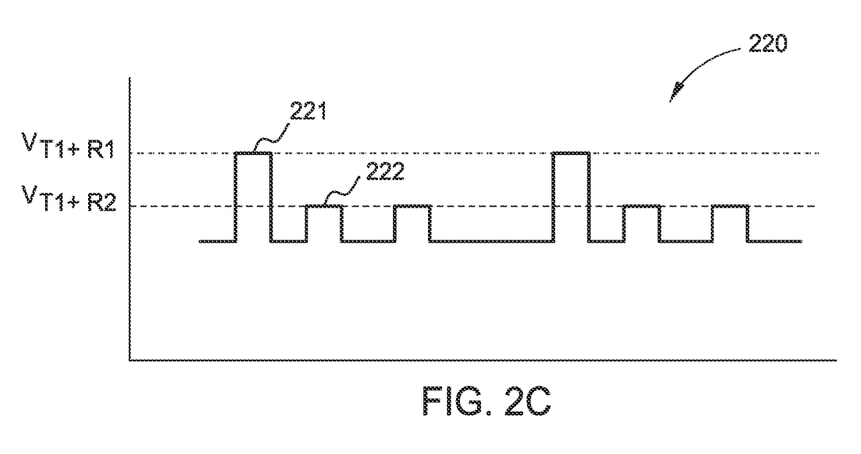

FIGS. 2A, 2B, and 2C illustrate examples of pulse train signals in accordance with one aspect of the present disclosure. Examples of time-varying power signals are illustrated in FIGS. 2A and 2B. The time-varying power signals (e.g., pulsed signals) may be used to gauge a reflectivity of a substrate, such as the substrate 101 shown in FIG. 1, during a calibration process performed with each new substrate. When a new substrate is introduced to an apparatus having a temperature measurement system therein, such the temperature measurement system described in connection with FIG. 1, each electromagnetic radiation source is pulsed a plurality of times, for example, 10 times, to determine the reflectivity of the substrate. In one or more embodiments, the temperature measurement system may rotate the substrate while pulsing the electromagnetic radiation sources, in case the reflectivity varies across a surface of the substrate. In other embodiments, the temperature measurement system may synchronize pulsing with the rotation, so the system double-samples the reflectivity using the different detectors 103 and 108.

FIG. 2A illustrates a signal 200 to be applied to the electromagnetic radiation source 102, which in turn emits electromagnetic radiation $L_1$ having time-varying intensity according to the signal 200. FIG. 2B illustrates a signal 210 to be applied to the electromagnetic radiation source 106, which in turn emits electromagnetic radiation $L_2$ having time-varying intensity according to the signal 210. The signal 200 is a time-varying voltage that has a peak 201 with a peak voltage $V_{L1}$ in a period time of $t_1$. The signal 210 is a time-varying voltage, with two peaks 211, each having a peak voltage $V_{L2}$, in a period time of $t_2$. In this embodiment, the peaks 201 and 211 do not overlap in time. FIG. 2C illustrates an exemplary signal 220 received by the pyrometer 110 when the electromagnetic radiation sources 102 and 106 are operated according to the signals 200 and 210, respectively. The pyrometer 110 receives reflected radiation $R_1$ and $R_2$, originating from the respective electromagnetic radiation sources 102 and 106, and emitted radiation $T_1$, which originates from the substrate 101 due to thermal energy of the substrate 101. The received signal 220 has three pulses, a first pulse 221 corresponding to the peak 201 of the signal 200 and second and third pulses 222 and 223 corresponding to the peaks 211 of the signal 210.

Figure 3A:
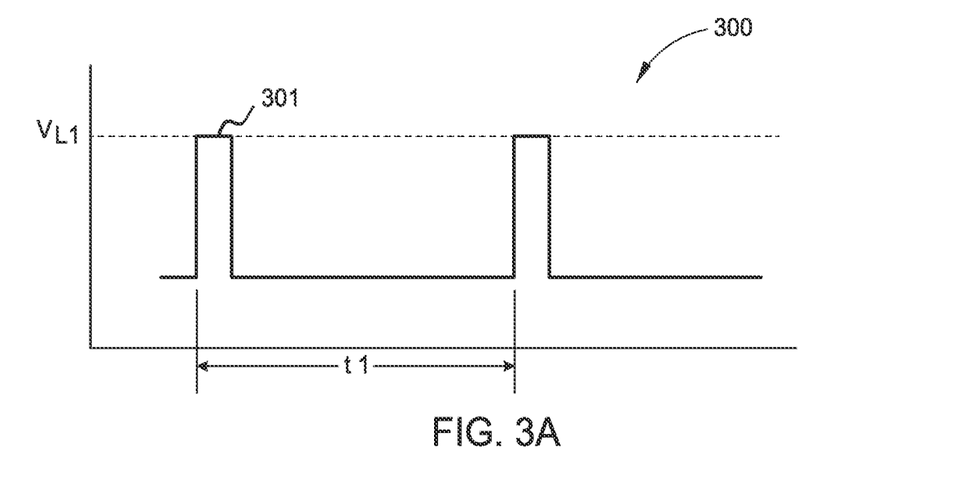
FIGS. 3A, 3B, and 3C illustrate other examples of pulse train signals in accordance with one aspect of the present disclosure.
Figure 3B:
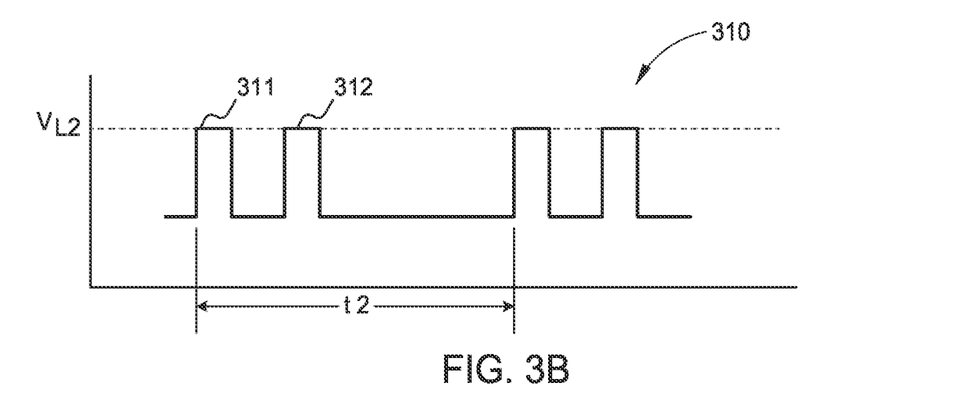

Different examples of time-varying power signals are illustrated in FIGS. 3A and 3B. FIG. 3A illustrates a signal 300 to be applied to the electromagnetic radiation source 102, and FIG. 3B illustrates a signal 310 to be supplied to the electromagnetic radiation source 106. The signal 300 is a time-varying voltage that has a peak 301 with a peak voltage $V_{L1}$ in a period time of $t_1$. The signal 310 is a time-varying voltage that has two peaks 311, 312, each with peak voltage $V_{L2}$ in a period time of $t_2$. Here, one peak 301 overlaps in time with a peak 311.

Figure 3C:
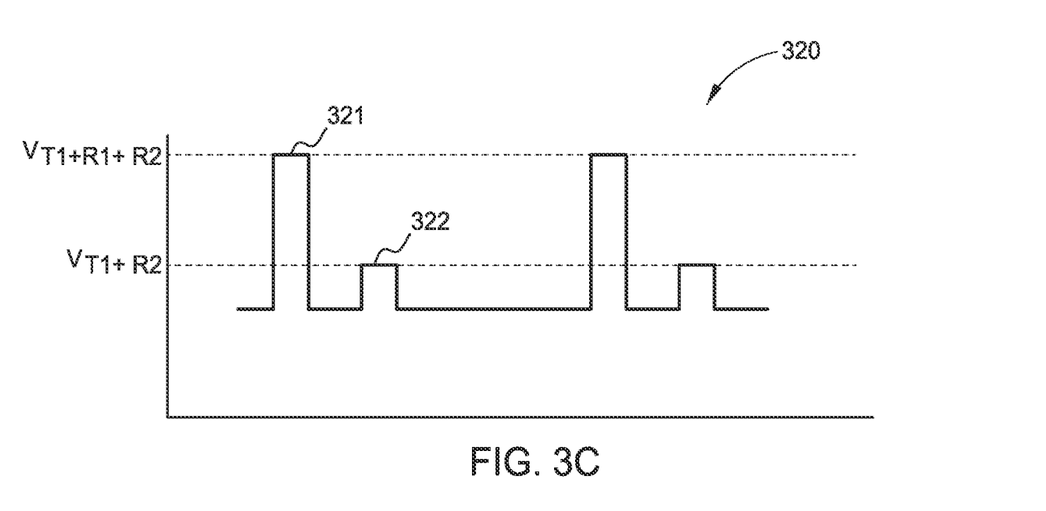

FIG. 3C illustrates an exemplary signal 320 received by the pyrometer 110 when the electromagnetic radiation sources 102 and 106 are operated according to the signals 300 and 310, respectively. The received signal 320 has two pulses, a first pulse 321 corresponding to the overlapped peaks 301 and 311, and a second pulse 322 corresponding to the peak 312. The first pulse 321 is produced by reflected electromagnetic radiation from both electromagnetic radiation sources 102 and 106 being received concurrently by the pyrometer 110.

Referring again to FIG. 1, electromagnetic radiation sources 102 and 106 emit electromagnetic radiation at all azimuthal angles in respective emission cones 131 and 132 toward the substrate 101. The electromagnetic radiation illuminates the substrate 101, and is partially absorbed, partially transmitted, and partially reflected in corresponding reflection cones in varying amounts at different wavelengths. Electromagnetic radiation reflected in a certain range of reflection angles proceeds toward, and may be detected by, the pyrometer 110. For example, using a ray-tracing approach for clarity, radiation $L_1$ and $L_2$ emitted in corresponding emission cones 131 and 132 from electromagnetic radiation sources 102 and 106 are incident at the substrate 101 with incidence angles 81 and 82, respectively, and partially reflected at the substrate 101. Reflected radiation $R_1$ and $R_2$ proceeds in a reflection area 133 toward and is detected by the pyrometer 110 as illustrated in FIG. 1. The reflection area 133 sampled by the pyrometer 110 contains a portion, defined by the azimuth viewed by the pyrometer 110, of a band of radiation reflected by the substrate 101 from each emission cone 131 and 132. When the incidence angles 81 and 82 are within a particular range, the reflected radiation is detected by the pyrometer 110 over the azimuth viewed by the pyrometer 110.

Figure 4:
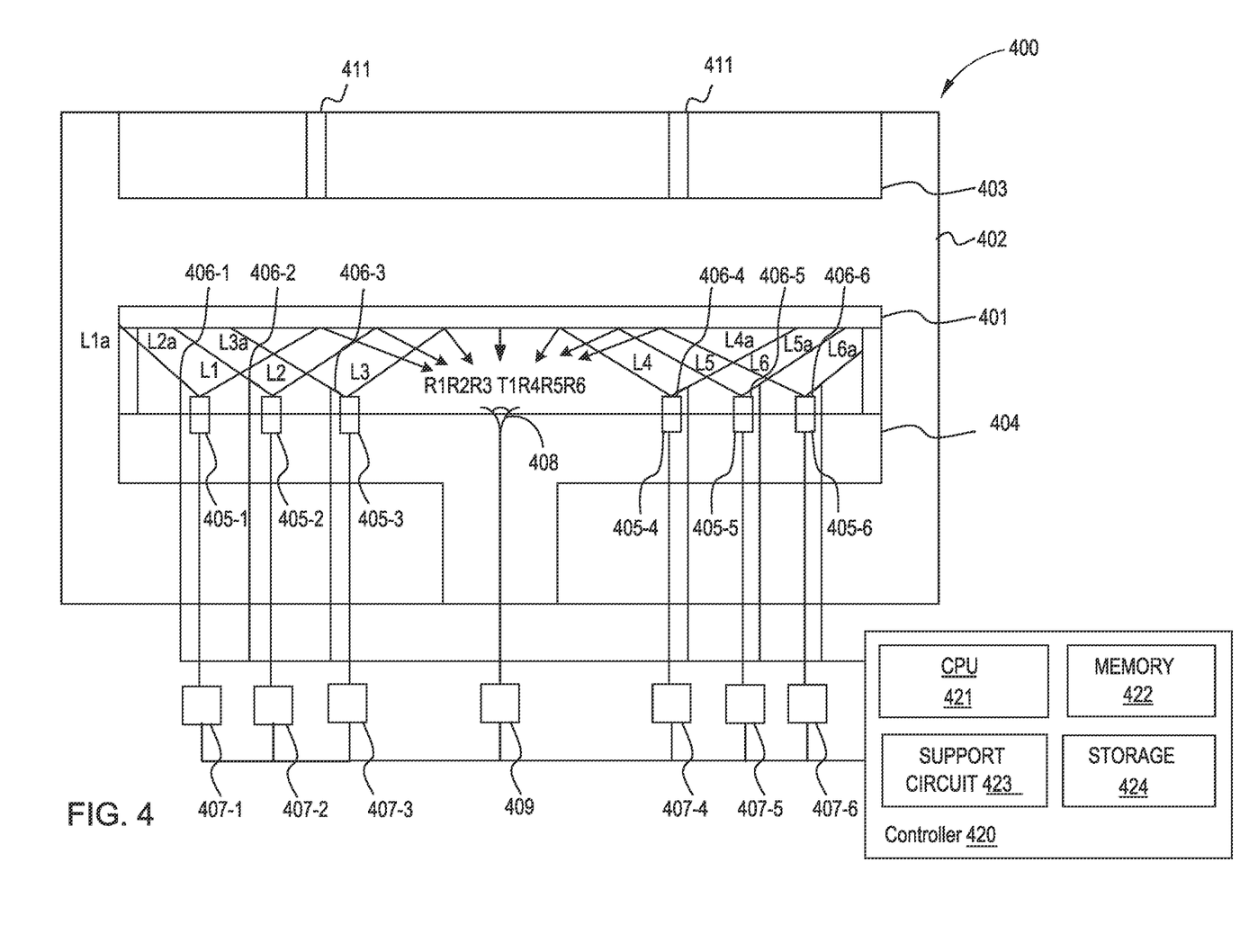
FIG. 4 illustrates a schematic cross-section of a processing chamber having the temperature measurement system of FIG. 1 incorporated thereto in accordance with aspects of the present disclosure.

FIG. 4 illustrates a schematic cross-section of a processing chamber 400 incorporating the temperature measurement system 100 of FIG. 1. The processing chamber 400 features an enclosure 402, a substrate support 404 disposed in the enclosure 402, a processing module 403 coupled to the enclosure 402, a plurality of electromagnetic radiation sources 405 (405-1, 405-2, 405-3, 405-4, 405-5, and 405-6) and signal generators 407 (407-1, 407-2, 407-3, 407-4, 407-5, and 407-6) coupled to the plurality sources 405, a plurality of detectors 406 (406-1, 406-2, 406-3, 406-4, 406-5, and 406-6), and a pyrometer 408.

The processing module 403 includes one or more conduits 411 (two are shown) for introducing materials into the enclosure 402. The conduits 411 may be used for introducing gases or liquids, and may be straight, as shown in FIG. 4, or tortuous to any desired degree. Two conduits 411 are shown in FIG. 4, but any number may be used. For example, the processing module 403 may include a showerhead, which may have multiple zones or pathways. The processing module 403 may be coupled to any desired delivery apparatus, such as gas boxes, evaporators, ampoules, and the like through appropriate conduits.

The substrate support 404 is heated by heating lamps embedded in the substrate support 404. The substrate support 404 may also be electrified, for example using bias elements, to provide electrostatic immobilization of a substrate 401 on the substrate support 404. A rotational drive (not shown) may be coupled to the substrate support 404 to provide rotary motion during processing, between processing cycles, or both. In embodiments wherein the substrate 401 is rotated during processing, the substrate 401 may be probed at selected intervals to monitor the temperature of different locations on the substrate 401 so that temperature uniformity may be controlled.

Each signal generator 407-1 to 407-6 is coupled to a respective electromagnetic radiation source 405. The signal generators 407-1 to 407-6 each generate time-varying signals and apply the time-varying signals to the respective electromagnetic radiation source 405. The electromagnetic radiation sources 405-1 to 405-6 emit electromagnetic radiation $L_1$ through $L_6$ toward the substrate 401. The plurality of electromagnetic radiation sources 405-1 to 405-6 can be heat sources for providing thermal energy to the substrate 401.

Each detector 406-1 to 406-6 is disposed adjacent to a respective electromagnetic radiation source 405-1 to 405-6 to detect electromagnetic radiation $L_{1a}$-$L_{6a}$ corresponding to electromagnetic radiation $L_1$-$L_6$, which are partially reflected at the substrate 401 and are received by the pyrometer 408. A portion of each electromagnetic radiation detector 406-1 to 406-6 is positioned in line-of-sight to the emitting element of a respective electromagnetic radiation source 405-1 to 405-6. The electromagnetic radiation detectors 406-1 to 406-6 include support circuits to sample the radiation beams $L_{1a}$-$L_{6a}$ at respective sampling rates.

The processing chamber 400 can include any number of sources 405, each with a corresponding signal generator 407 and electromagnetic radiation detector 406.

The pyrometer 408 detects electromagnetic radiation propagating toward the pyrometer 408 from the substrate 401. The radiation detected by the pyrometer 408 includes radiation $T_1$ emitted from the substrate 401 and the reflected radiation $R_1$-$R_6$.

In operation, the processing chamber 400 estimates a temperature of the substrate 401 in a manner similar to that described above with respect to FIG. 1. Here, the processing chamber 400 includes six (6) electromagnetic radiation sources 405-1 to 405-6 and detector 406-1 to 406-6 s, but any number of sources and detectors can be used. In such embodiments, the pyrometer 408 will return the intensity of radiation $I\_S_P$ sourced from any number of electromagnetic radiation sources, reflected from the substrate 401, and the emitted electromagnetic radiation $T_1$ as follows:

$$I\_S_P = I\_T_1 + \Sigma_{i=1}^{i=n} I\_R_i \qquad (6)$$

Based on the definition of the reflectivity p, which can be determined as described above in connection with FIGS. 2A-3C, Equation 6 can be rewritten as:

$$I\_T_1 = I\_S_P - \Sigma_{i=1}^{i=n} \rho I\_L_i \qquad (7)$$

Each electromagnetic radiation $L_1, L_2, L_3, \ldots L_n$ has substantially the same intensity as the corresponding electromagnetic radiation $L_{1a}, L_{2a}, L_{3a}, \ldots L_{na}$, which are sampled by the electromagnetic radiation detectors 406. Thus, Equation 7 can be rewritten as:

$$I\_T_1 = I\_S_P - \Sigma_{i=1}^{i=n} \rho I\_L_{ia} \qquad (8)$$

Consequently, the intensity $I\_T_1$ of the emitted electromagnetic radiation is calculated by subtracting the intensity $\Sigma_{i=1}^{i=n} \rho I\_L_{ia}$ of the reflected radiation, based on the determined reflectivity p and the incident electromagnetic radiation $I\_L_{ia}$ detected by the detectors 406, from the intensity $I\_S_P$ of the total radiation returned by the pyrometer 408. The temperature of the substrate 401 is then estimated by applying Planck's Law to the intensity $I\_T_1$ of the emitted electromagnetic radiation $T_1$, as described in association with FIG. 1.

The electromagnetic radiation sources, detectors, and pyrometer are shown in FIG. 4 installed below the substrate 401. However, these components may be disposed at any convenient location in the processing chamber 400, such as a location above the substrate 401.

The processing chamber 400 may be a chemical vapor deposition (CVD) chamber, such as a plasma enhanced CVD chamber, a high-density plasma CVD chamber, a low pressure CVD chamber, a reduced pressure CVD chamber, or an atmospheric pressure CVD chamber. In other embodiments, the processing chamber 400 may also be a PVD chamber, an etch chamber (thermal or plasma), an epitaxy chamber, an anneal chamber, or any other processing chamber in which temperature monitoring might be useful. Examples of the processing chamber 400 can include CVD chambers such as AKT® PECVD chambers, PRODUCER™ chambers, and PRECISION 5000® chambers commercially available from Applied Materials Inc., Santa Clara, Calif.

The controller 420 may be substantially identical to the controller of FIG. 1. The controller 420 may be coupled to the pyrometer 408 and relevant circuits thereof to monitor data received by the pyrometer 408 and process the data to estimate a temperature of the substrate 401.

In one or more embodiments, the processing chamber 400 can include a plurality of pyrometers 408 to detect temperatures at multiple positions of the substrate 401. By using the temperature indications from the plurality of pyrometers 408, temperature non-uniformity of the substrate 401 can be detected, and the temperature uniformity thereof can be improved.

In other embodiments, a plurality of substrates may be disposed on the substrate support 404 to be concurrently processed in the processing chamber 400, and a plurality of pyrometers can be provided, with one or more pyrometers corresponding to each substrate.

Figure 5:
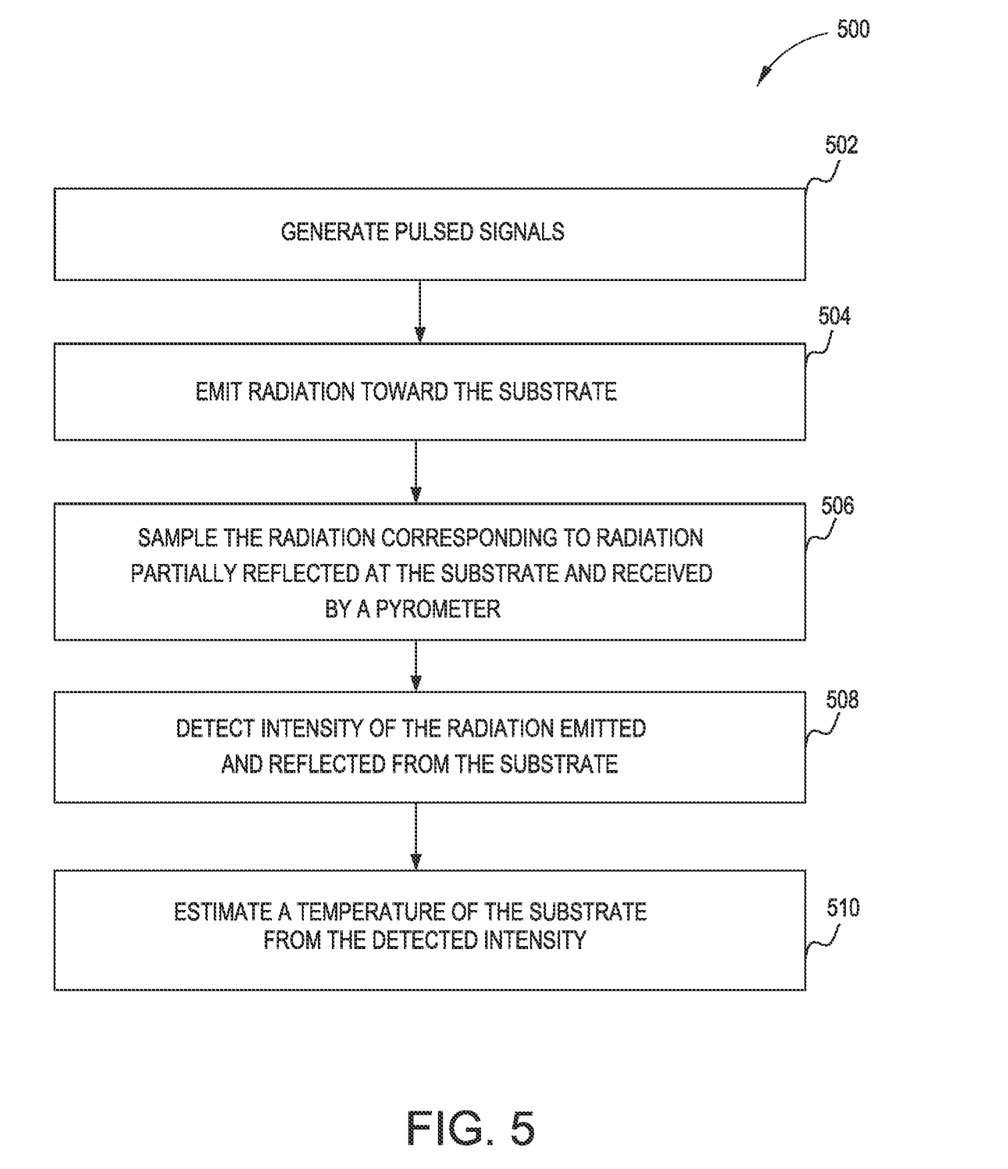
FIG. 5 is a flowchart of an exemplary method for detecting an endpoint of the seasoning process in accordance with aspects of the present disclosure.

FIG. 5 is a flowchart 500 for an exemplary method of estimating substrate temperature in accordance with aspects of the present disclosure.

In operation 502, a signal generator is used to generate pulsed signals of time-varying power to an electromagnetic radiation source. The signal generator can generate various waveforms with different periodicities, pulse shapes (e.g., sinusoidal pulses or triangular pulses), pulse patterns and/or amplitudes. More than one electromagnetic radiation source can be used, with each electromagnetic radiation source including a respective signal generator.

In operation 504, the electromagnetic radiation source emits electromagnetic radiation toward a substrate according to the signal from the signal generator. In the event multiple electromagnetic radiation sources are used, each source emits according to the signal from the corresponding signal generator.

In operation 506, a detector detects electromagnetic radiation, including the radiation emitted by the electromagnetic radiation source. In one or more embodiments, a probe head of each detector is disposed in line-of-sight to an emitting element of a corresponding electromagnetic radiation source. The emitted electromagnetic radiation has a substantially constant intensity at all angles. In one or more embodiments, a probe head of the detector can be aligned to a conical surface of the emission cone of the electromagnetic radiation source. In the event multiple electromagnetic radiation sources are used, each source has a corresponding detector.

In operation 508, a pyrometer detects the intensity of electromagnetic radiation emitted and/or reflected from the substrate. The electromagnetic radiation received at the pyrometer includes thermal electromagnetic radiation emitted from the substrate, and electromagnetic radiation reflected from the substrate.

In operation 510, the controller determines the intensity of the emitted electromagnetic radiation ($T_1$ in FIG. 1) by subtracting a sum of sampled electromagnetic radiation intensities from the total intensity of the electromagnetic radiation received by the pyrometer to obtain the emitted intensity. The controller further estimates a temperature T of the substrate by applying the Planck's law to the determined emitted electromagnetic radiation intensity as described above.

Embodiments of the present disclosure further relate to any one or more of the following paragraphs:

1. An apparatus for estimating a temperature, comprising: a plurality of electromagnetic radiation sources positioned to emit electromagnetic radiation toward a reflection plane; a plurality of electromagnetic radiation detectors, each electromagnetic radiation detector positioned to sample the electromagnetic radiation emitted by a corresponding electromagnetic radiation source of the plurality of electromagnetic radiation sources; a pyrometer positioned to receive electromagnetic radiation originating from the plurality of electromagnetic radiation sources and reflected from the reflection plane; and a processor configured to estimate a temperature based on the electromagnetic radiation received by the pyrometer and by the electromagnetic radiation detectors.

2. An apparatus for estimating a temperature, comprising: a plurality of electromagnetic radiation sources positioned to emit electromagnetic radiation toward a reflection plane, wherein each electromagnetic radiation source is configured to emit electromagnetic radiation in an emission cone; a plurality of electromagnetic radiation detectors, each electromagnetic radiation detector positioned to sample the electromagnetic radiation emitted by a corresponding electromagnetic radiation source of the plurality of electromagnetic radiation sources; a pyrometer positioned to receive electromagnetic radiation originating from the plurality of electromagnetic radiation sources and reflected from the reflection plane; and a processor configured to estimate a temperature based on the electromagnetic radiation received by the pyrometer and by the electromagnetic radiation detectors.

3. A method for estimating a temperature, the method comprising: emitting, by each of a plurality of electromagnetic radiation sources, electromagnetic radiation toward a substrate; sampling, by each of a plurality of electromagnetic radiation detectors, the electromagnetic radiation emitted by a corresponding electromagnetic radiation source of the plurality of electromagnetic radiation sources; receiving, by a pyrometer, electromagnetic radiation reflected from the substrate and electromagnetic radiation emitted by the substrate; and estimating, using a processor, a temperature of the substrate based on the electromagnetic radiation emitted by the substrate.

4. The apparatus or the method according to any one of paragraphs 1-3, wherein each electromagnetic radiation detector includes a probe head disposed in line-of-sight to an emitting element of the corresponding electromagnetic radiation source.

5. The apparatus or the method according to paragraph 4, wherein each electromagnetic radiation source is configured to emit electromagnetic radiation in an emission cone toward the reflection plane, and a portion of the electromagnetic radiation in the emission cone at a first angle is reflected from the reflection plane and then is received by the pyrometer.

6. The apparatus or the method according to paragraph 5, wherein a probe head of each electromagnetic radiation detector is curved to be aligned to a conical surface of the emission cone, and is configured to sample the electromagnetic radiation in the emission cone at a second angle.

7. The apparatus or the method according to paragraph 6, wherein the one portion of electromagnetic radiation in the emission cone at the first angle has a substantially same intensity as another portion of electromagnetic radiation in the emission cone at the second angle.

8. The apparatus or the method according to any one of paragraphs 1-7, wherein the processor is configured to receive an intensity of electromagnetic radiation received by the pyrometer and an intensity of electromagnetic radiation sampled by the electromagnetic radiation detectors, determine an intensity of reflected radiation from the reflection plane from the intensity of electromagnetic radiation sampled by the electromagnetic radiation detectors, and subtract the intensity of reflected radiation from the electromagnetic radiation received by the pyrometer to estimate the temperature.

9. The apparatus or the method according to paragraph 8, wherein the intensity of reflected radiation from the reflection plane is determined by applying a known reflectivity at the reflection plane to the intensity of electromagnetic radiation sampled by the electromagnetic radiation detectors.

10. The apparatus or the method according to paragraph 9, wherein the reflectivity is determined by: calculating a first quantity by subtracting a minimum intensity of electromagnetic radiation sampled by the electromagnetic radiation detector from a maximum intensity of electromagnetic radiation sampled by the electromagnetic radiation detector; calculating a second quantity by subtracting a minimum intensity of electromagnetic radiation detected by the pyrometer from a maximum intensity of electromagnetic radiation detected by the pyrometer; and calculating a ratio of the first quantity to the second quantity.

11. The apparatus or the method according to any one of paragraphs 1-10, wherein the temperature is estimated by applying Planck's Law to a difference between an intensity of electromagnetic radiation received by the pyrometer and an intensity of electromagnetic radiation reflected from the reflection plane.

12. The apparatus or the method according to paragraph 11, wherein each electromagnetic radiation detector includes a probe head disposed in line-of-sight to an emitting element of the corresponding electromagnetic radiation source.

13. The apparatus or the method according to paragraph 12, wherein each electromagnetic radiation source emits electromagnetic radiation in an emission cone toward the substrate, and a portion of the electromagnetic radiation in the emission cone at a first angle is reflected from the reflection plane and then is received by the pyrometer.

14. The apparatus or the method according to paragraph 13, wherein a probe head of each electromagnetic radiation detector is curved to be aligned to a conical surface of the emission cone, and is configured to substrate the electromagnetic radiation in the emission cone at a second angle.

15. The apparatus or the method according to paragraph 14, wherein electromagnetic radiation in the emission cone at the first angle has substantially the same intensity as electromagnetic radiation in the emission cone at the second angle.

16. The apparatus or the method according to paragraph 15, further comprising determining electromagnetic radiation emitted by the substrate by subtracting the electromagnetic radiation reflected from the substrate from the electromagnetic radiation received by the pyrometer.

17. The apparatus or the method according to paragraph 16, further comprising calculating the intensity of electromagnetic radiation emitted by the substrate by multiplying the intensity of electromagnetic radiation sampled by each electromagnetic radiation source by a known reflectivity of the substrate, summing the result, and subtracting the sum from the intensity of electromagnetic radiation received by the pyrometer.

18. The apparatus or the method according to paragraph 17, wherein the reflectivity of the substrate is a ratio of an intensity of reflected electromagnetic radiation to an intensity of incident electromagnetic radiation.

19. The apparatus or the method according to paragraph 17, wherein the reflectivity of the substrate is calculated by dividing a maximum intensity minus a minimum intensity of electromagnetic radiation emitted by an electromagnetic radiation source by a maximum intensity minus a minimum intensity of electromagnetic radiation emitted by the electromagnetic radiation source and reflected from the reflection plane.

20. The apparatus or the method according to any one of paragraphs 1-19, further comprising estimating a temperature of the substrate by applying Planck's Law to the electromagnetic radiation emitted by the substrate.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein include one or more operations or actions for achieving the methods. The method operations and/or actions may be interchanged with one another without departing from the scope of the claims or the disclosure. In other words, unless a specific order of operations or actions is specified, the order and/or use of specific operations and/or actions may be modified without departing from the scope of the claims.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

While the foregoing is directed to embodiments of the present disclosure, other and further embodiments of the disclosure may be devised without departing from the basic scope thereof, and the scope thereof is determined by the claims that follow.

The invention claimed is:

1. An apparatus for estimating a temperature, comprising:
a plurality of electromagnetic radiation sources positioned to emit electromagnetic radiation toward a reflection plane;
a plurality of electromagnetic radiation detectors, each electromagnetic radiation detector including a probe head configured to receive electromagnetic radiation, the probe head positioned at a location between the electromagnetic radiation sources and the reflection plane in order to sample the electromagnetic radiation emitted by a corresponding electromagnetic radiation source of the plurality of electromagnetic radiation sources;
a pyrometer positioned to receive electromagnetic radiation originating from the plurality of electromagnetic radiation sources and reflected from the reflection plane; and
a processor configured to output a temperature estimate based on the electromagnetic radiation received by the pyrometer and sampled by the electromagnetic radiation detectors.

2. The apparatus of claim 1, wherein the temperature is estimated by applying Planck's Law to a difference between an intensity of electromagnetic radiation received by the pyrometer and an intensity of electromagnetic radiation reflected from the reflection plane.

3. The apparatus of claim 1, wherein the processor is configured to receive an intensity of electromagnetic radiation received by the pyrometer and an intensity of electromagnetic radiation sampled by the electromagnetic radiation detectors, determine an intensity of reflected radiation from the reflection plane from the intensity of electromagnetic radiation sampled by the electromagnetic radiation detectors, and subtract the intensity of reflected radiation from the intensity of electromagnetic radiation received by the pyrometer to estimate the temperature.

4. The apparatus of claim 3, wherein the intensity of reflected radiation from the reflection plane is determined by applying a known reflectivity at the reflection plane to the intensity of electromagnetic radiation sampled by the electromagnetic radiation detectors.

5. The apparatus of claim 4, wherein the reflectivity is determined by:
  calculating a first quantity by subtracting a minimum intensity of electromagnetic radiation sampled by at least one of the electromagnetic radiation detectors of the plurality of electromagnetic radiation detectors from a maximum intensity of electromagnetic radiation sampled by the electromagnetic radiation detector;
  calculating a second quantity by subtracting a minimum intensity of electromagnetic radiation detected by the pyrometer from a maximum intensity of electromagnetic radiation detected by the pyrometer; and
  calculating a ratio of the first quantity to the second quantity.

6. The apparatus of claim 1, wherein each probe head is disposed in a line-of-sight to an emitting element of the corresponding electromagnetic radiation source.

7. The apparatus of claim 6, wherein each electromagnetic radiation source is configured to emit electromagnetic radiation in an emission cone toward the reflection plane, and a portion of the electromagnetic radiation in the emission cone at a first angle is reflected from the reflection plane and then is received by the pyrometer.

8. The apparatus of claim 7, wherein the probe head of each electromagnetic radiation detector is curved to be aligned to a conical surface of the emission cone, and is configured to sample the electromagnetic radiation in the emission cone at a second angle.

9. The apparatus of claim 8, wherein the portion of electromagnetic radiation in the emission cone at the first angle has a substantially same intensity as another portion of electromagnetic radiation in the emission cone at the second angle.

10. An apparatus for estimating a temperature, comprising:
  a plurality of electromagnetic radiation sources positioned to emit electromagnetic radiation toward a reflection plane, wherein each electromagnetic radiation source is configured to emit electromagnetic radiation in an emission cone; a plurality of electromagnetic radiation detectors, each electromagnetic radiation detector including a probe head configured to receive electromagnetic radiation, the probe head positioned at a location between the electromagnetic radiation sources and the reflection plane in order to sample the electromagnetic radiation emitted by a corresponding electromagnetic radiation source of the plurality of electromagnetic radiation sources;
  a pyrometer positioned to receive electromagnetic radiation originating from the plurality of electromagnetic radiation sources and reflected from the reflection plane; and
  a processor configured to output a temperature estimate based on the electromagnetic radiation received by the pyrometer and sampled by the electromagnetic radiation detectors.

11. The apparatus of claim 10, wherein the temperature is estimated by applying Planck's Law to a difference between an intensity of electromagnetic radiation received by the pyrometer and an intensity of electromagnetic radiation reflected from the reflection plane.

12. The apparatus of claim 10, wherein the processor is configured to receive an intensity of electromagnetic radiation received by the pyrometer and an intensity of electromagnetic radiation sampled by the electromagnetic radiation detectors, determine an intensity of reflected radiation from the reflection plane from the intensity of electromagnetic radiation sampled by the electromagnetic radiation detectors, and subtract the intensity of reflected radiation from the intensity of electromagnetic radiation received by the pyrometer to estimate the temperature.

13. The apparatus of claim 12, wherein the intensity of reflected radiation from the reflection plane is determined by applying a known reflectivity at the reflection plane to the intensity of electromagnetic radiation sampled by the electromagnetic radiation detectors.

14. The apparatus of claim 13, wherein the reflectivity is determined by:
  calculating a first quantity by subtracting a minimum intensity of electromagnetic radiation sampled by at least one of the electromagnetic radiation detectors of the plurality of electromagnetic radiation detectors from a maximum intensity of electromagnetic radiation sampled by the electromagnetic radiation detector;
  calculating a second quantity by subtracting a minimum intensity of electromagnetic radiation detected by the pyrometer from a maximum intensity of electromagnetic radiation detected by the pyrometer; and
  calculating a ratio of the first quantity to the second quantity.

15. The apparatus of claim 10, wherein each probe head is disposed in a line-of-sight to an emitting element of the corresponding electromagnetic radiation source.

16. The apparatus of claim 15, wherein a portion of the electromagnetic radiation in the emission cone at a first angle is reflected from the reflection plane and then is received by the pyrometer.

17. The apparatus of claim 16, wherein the probe head of each electromagnetic radiation detector is curved to be aligned to a conical surface of the emission cone, and is configured to sample the electromagnetic radiation in the emission cone at a second angle.

18. The apparatus of claim 17, wherein the portion of electromagnetic radiation in the emission cone at the first angle has a substantially same intensity as another portion of electromagnetic radiation in the emission cone at the second angle.

* * * * *